June 18, 1957 R. E. FEUCHT 2,796,559

ELECTRICAL APPARATUS

Filed Sept. 11, 1952 2 Sheets-Sheet 1

INVENTOR.
ROBERT E. FEUCHT
BY
S. Hartz
ATTORNEY

June 18, 1957 R. E. FEUCHT 2,796,559

ELECTRICAL APPARATUS

Filed Sept. 11, 1952 2 Sheets-Sheet 2

INVENTOR.
ROBERT E. FEUCHT
BY
[signature]
ATTORNEY

United States Patent Office 2,796,559

Patented June 18, 1957

2,796,559

ELECTRICAL APPARATUS

Robert E. Feucht, North Bergen, N. J., assignor to Bendix Aviation Corporation, Teterboro, N. J., a corporation of Delaware Application September 11, 1952, Serial No. 309,065

13 Claims. (Cl. 317—100)

The invention relates to electrical apparatus and more particularly to electrical apparatus using one or more circuit components generating substantial quantities of heat which must be dissipated.

Heretofore, in some electrical apparatus, such as radios, television sets, etc. heat generated by vacuum tubes, resistors and other circuit components could be dissipated by convection currents, but where the electrical apparatus is confined to a restricted space or is sealed to the atmosphere, convection currents are not sufficient to cool the apparatus and the apparatus operates at excessive temperatures which impair the life of the apparatus or render it inoperative. These operating conditions occur in apparatus used in aircraft and it is especially desirable that the apparatus be reliable because the lives of many people depend on it.

The main object of the present invention is to provide electrical apparatus sealed to the atmosphere which readily dissipates heat generated within the apparatus by the circuit components so that the apparatus operates at relatively low temperatures.

Another object is to facilitate manufacture and assembly of the apparatus by forming a plurality of cards each mounting one or more electrical components and associated connections and which may be readily assembled to desired circuit configuration and inserted in a sealed container. Each card comprises a sheet of heat conducting material mounting the heat generating electrical components in heat conducting relationship therewith. Each card has means, such as a plurality of fingers of heat conducting material, extending around the periphery of the sheet, in heat conducting relationship with the sheet. The cards are received within the container with the fingers engaging its inner surface so that heat from the components is conducted by the sheet and the fingers to the container for radiation by the container to the surrounding atmosphere.

The foregoing and other objects and advantages of the invention will appear more fully hereinafter from a consideration of the detailed description which follows, taken together with the accompanying drawings wherein one embodiment of the invention is illustrated. It is to be expressly understood, however, that the drawings are for the purposes of illustration and descrpition only, and are not to be construed as defining the limits of the invention.

Figure 1:
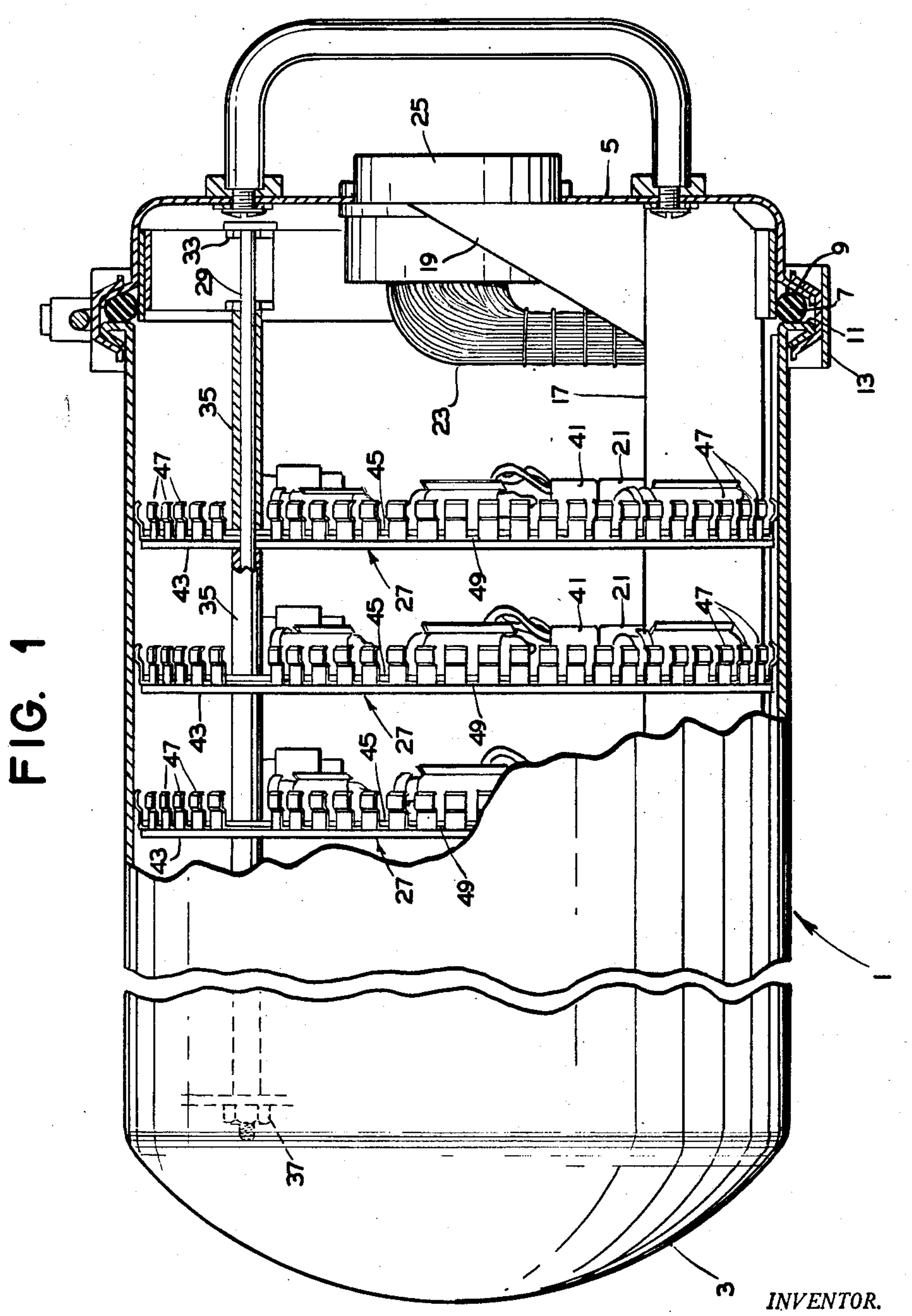
Figure 1 is in part a side view and in part a vertical section of an amplifier constructed according to the invention.

Referring now to the drawings for a more detailed description of the novel electrical apparatus of the present invention, the apparatus is shown in Figure 1 as comprising a container 1 of heat conducting material, such as aluminum, preferably blackened on its inner and outer surfaces to provide for better heat absorption from within and radiation from the container to the surrounding atmosphere. The container is cylindrical in form and has a curved bottom wall 3 at one end and a cover 5 at its opposite end. A gasket 7 is interposed between a flange 9 on the cover and a flange 11 on the associated end of the container to seal the container to the atmosphere and the cover is held in place by a clamping ring 13. A handle 15 on cover 5 facilitates handling the container and provides for removing the cover and associated assembly described below from the container.

An elongated channel 17 is secured by a bracket 19 or other suitable means to the inner surface of the cover and extends parallel to the axis of the container. A plurality of electrical receptacles 21 are mounted on channel 17 with suitable electrical connections 23 from one receptacle to the other and to a master receptacle 25 positioned substantially centrally of cover 5.

A plurality of cards 27 are assembled to cover 5 by a pair of elongated rods 29 secured at one end to clips 33 on the cover. Spacers 35 of suitable length are positioned on the rods between the cards and maintain the cards in spaced relationship with one another. Nuts 37 may be threaded on the ends of the rods to hold the cards assembled thereto. Each card has a recess 39 for receiving channel 17 and a plug 41 adjacent thereto received by an associated receptacle 21 on the channel. The cards at one side are maintained assembled to the cover by the cooperating plugs and receptacles and at the other side by the rods and spacers.

Figures 2, 3, 4, 5:
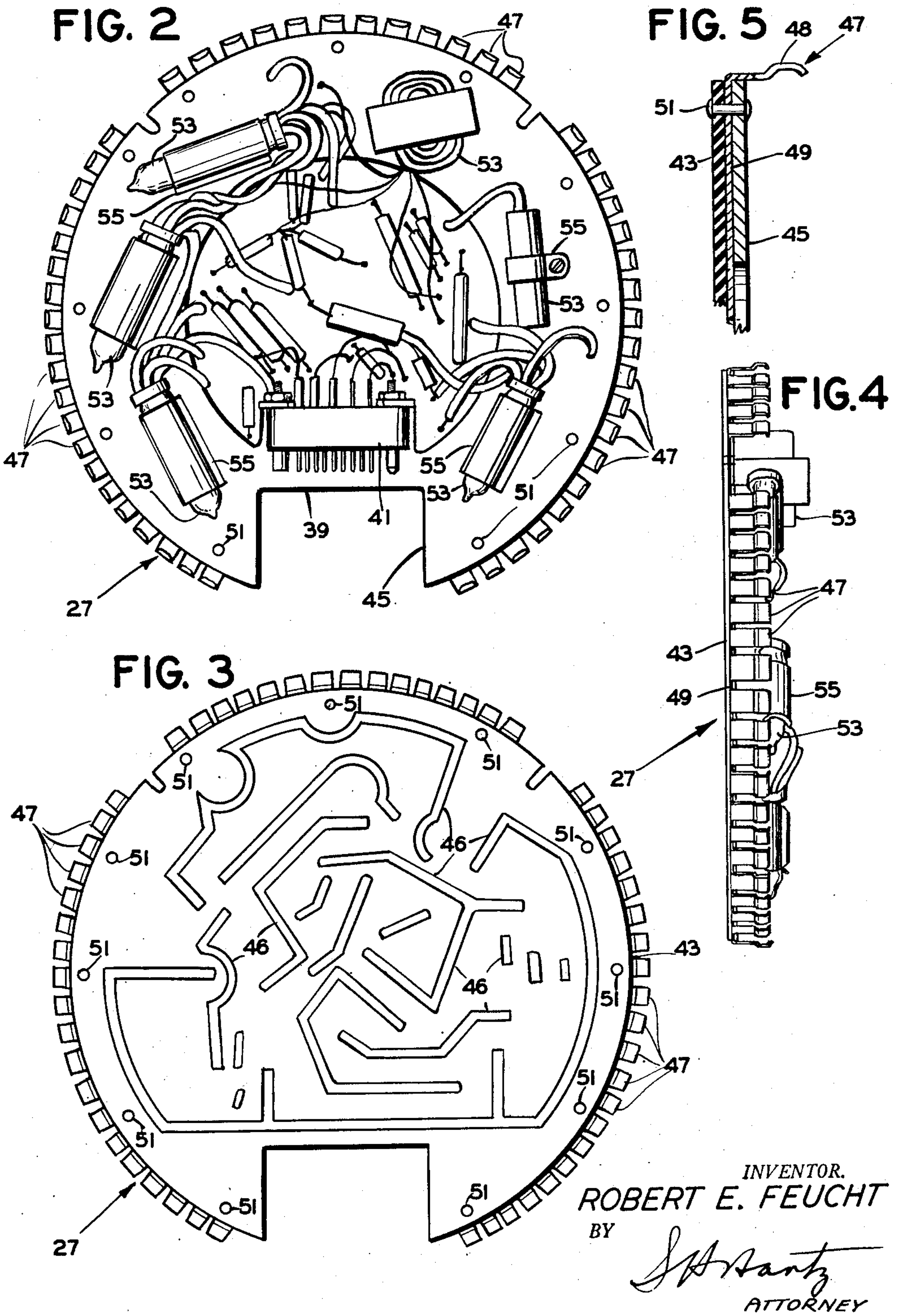
Figure 2 is a top view of one of the cards of the amplifier.
Figure 3 is a bottom view thereof.
Figure 4 is a side view of the card.
Figure 5 is a transverse section through the card showing details of its construction.

Each card 27 (see Figure 5) comprises a substantially circular sheet 43 on insulating material, such as phenolic board, or glass laminate impregnated with melamine, and an annulus 45 of heat conducting material, such as "Alcuplate" which comprises an aluminum sheet with a layer of copper adhering to each surface. A plurality of yielding fingers 47 with a relative flat portion 48 are positioned in heat conducting relationship with annulus 45 and extend around its periphery. Fingers 47 are formed integral with a flange 49 received between sheet 43 and annulus 45 and the flange is soldered to annulus 45 to provide for good heat transfer therebetween. Sheet 43, annulus 45 and flange 49 are then secured together in any suitable manner, such as by rivets 51.

Heat generating circuit components 53 of the circuit (Figure 2), such as vacuum tubes, high watt resistors, transformers, etc. are mounted in heat conducting relationship with annulus 45 in any suitable manner, such as by means of clips 55, soldered or otherwise secured directly to the annulus. Suitable circuit connections 46 may be etched or printed in any of the well known methods directly on insulating sheet 43 for electrically connecting the components. Non-heat generating components, such as condensers, low watt resistors, etc., are mounted on insulating sheet 43 within the opening of the annulus on the same side of the sheet as the heat generating components 53.

When the cards are assembled to cover 5 in the manner described above and the assembly is received within container 1, flat portions 48 of fingers 47 engage a substantial area of the inner surface of the container and heat generated by the heat generating components 53 is conducted by annulus 45 and fingers 47 to the container where it is radiated to the surrounding atmosphere. Heat from the heated components is dissipated in this manner and the apparatus operates at much lower temperatures than it would if the apparatus relied solely on convection currents within the sealed container for cooling the heat generating components.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a device of the class described, a closed container of heat conducting material, a plurality of cards within said container each comprising a sheet of heat conducting material and means connecting said sheet in heat conducting relationship to said container, heat generating electrical components mounted on said sheets in heat conducting relationship therewith so that heat from said components is conducted by said sheet and said means to said container for radiation by said container to the surrounding atmosphere.

2. In a device of the class described, a container of heat conducting material, at least one card within said container comprising a sheet of heat conducting material having a plurality of fingers of heat conducting material in heat conducting relationship with said sheet and extending around its periphery and engaging the inner surface of said container, heat generating electrical components mounted on said sheet in heat conducting relationship therewith so that heat from said components is conducted by said sheet and said fingers to said container for radiation by said container to the surrounding atmosphere.

3. In a device of the class described, a plurality of cards each comprising a sheet of heat conducting material, heat generating electrical components mounted on said sheets in heat conducting relationship therewith, each of said cards having yielding means extending around the periphery of said sheet and in heat conducting relationship to said sheet, means for assembling said cards into a unitary structure, and a container of heat conducting material receiving said structure and engaging said means to radiate heat from said structure to the surrounding atmosphere.

4. In a device of the class described, a plurality of cards each comprising a sheet of heat conducting material, heat generating electrical components mounted on said sheets in heat conducting relationship therewith, each of said cards having a plurality of fingers of heat conducting material in heat conducting relationship to said sheet and extending around its periphery, means for assembling said cards into a unitary structure, and a container of heat conducting material receiving said structure and engaging said fingers to radiate heat from said structure to the surrounding atmosphere.

5. In a device of the class described, a container of heat conducting material, a plurality of cards mounted within said container each comprising a first sheet of insulating material having circuit connections thereon and a second sheet of heat conducting material secured to said first sheet, heat generating electrical components mounted on said second sheets in heat conducting relationship therewith and connected to said circuit connections, each of said cards having yielding means in heat conducting relationship to said second sheet and extending around its periphery and engaging the inner surface of said container to conduct heat from said electrical components to said container.

6. In a device of the class described, a container of heat conducting material, a plurality of cards mounted within said container and each comprising a first sheet of insulating material having circuit connections etched thereon and a second sheet of heat conducting material secured to said first sheet, heat generating electrical components mounted on said second sheets in heat conducting relationship therewith and connected to said circuit connections, each of said cards having a plurality of fingers of heat conducting material in heat conducting relationship to said second sheet and extending around its periphery and engaging the inner surface of said container to conduct heat from said electrical components to said container.

7. In a device of the class described, a container of heat conducting material, a plurality of cards mounted within said container and each comprising a sheet of insulating material having circuit connections etched thereon and an annulus of heat conducting material secured to said sheet, heat generating electrical components mounted on said annulus in heat conducting relationship therewith and connected to said circuit connections, non-heat generating circuit components mounted on said sheet in the opening of said annulus, each of said cards having means in heat conducting relationship to said annulus and extending around its periphery and engaging the inner surface of said container to conduct heat from said electrical components to said container.

8. In a device of the class described, a container of heat conducting material, a plurality of cards each comprising a sheet of heat conducting material, heat generating electrical components mounted on said sheet in heat conducting relationship therewith, each of said cards having a plurality of yielding fingers of heat conducting material in heat conducting relationship to said sheet and extending around its periphery, said fingers having flat portions engaging a substantial area of the inner surface of said container to conduct heat from said electrical components to said container for radiation to the surrounding atmosphere.

9. In a device of the class described, a card comprising a sheet of heat conducting material having yielding means in heat conducting relationship therewith and extending around its periphery, and heat generating electrical components mounted on said sheet in heat conducting relationship therewith and with said means so that heat is conducted from said heat generating components through said sheet to said means.

10. In a device of the class described, a card comprising a sheet of heat conducting material having a plurality of fingers of heat conducting material in heat conducting relationship therewith and extending around its periphery, and heat generating electrical components mounted on said sheet in heat conducting relationship therewith and with said fingers.

11. In a device of the class described, a card comprising a sheet of heat conducting material having a plurality of yielding fingers of heat conducting material in heat conducting relationship therewith and extending around its periphery, each of said fingers having a flat portion, and heat generating electrical components mounted on said sheet in heat conducting relationship therewith.

12. In a device of the class described, a card comprising a sheet of insulating material having circuit connections etched thereon and a sheet of heat conducting material secured to said insulating sheet, heat generating electrical components mounted on said conducting sheet in heat conducting relationship therewith and connected to said circuit connections, and a plurality of yielding fingers of heat conducting material in heat conducting relationship to said conducting sheet and extending around its periphery.

13. In a device of the class described, a card comprising a sheet of insulating material having circuit connections etched thereon and an annulus of heat conducting material secured to said insulating sheet, heat generating electrical components mounted on said annulus in heat conducting relationship therewith and connected to said circuit connections, non-heat generating electrical components mounted on said insulating sheet within the annulus opening and connected to said circuit connections, and a plurality of yielding fingers of heat conducting material in heat conducting relationship to said annulus extending around its outer periphery.

(References on following page)

References Cited in the file of this patent

UNITED STATES PATENTS

| | | |
|---|---|---|
| 1,659,309 | Auld | Feb. 14, 1928 |
| 1,688,622 | Johnson | Oct. 23, 1928 |
| 1,689,910 | Brocklebank | Oct. 30, 1928 |
| 1,756,888 | Selby | Apr. 29, 1930 |
| 1,791,783 | Andrews | Feb. 10, 1931 |
| 1,822,698 | How | Sept. 8, 1931 |
| 2,066,876 | Carpenter | Jan. 5, 1937 |
| 2,137,035 | Swallow | Nov. 15, 1938 |
| 2,170,176 | Wiegand | Aug. 22, 1939 |
| 2,198,465 | Stokes | Apr. 23, 1940 |
| 2,310,017 | Canon | Feb. 2, 1943 |
| 2,345,038 | De Lange | Mar. 28, 1944 |
| 2,353,461 | Hamann | July 11, 1944 |
| 2,445,805 | Skinker | July 27, 1948 |
| 2,499,589 | Kennedy | Mar. 7, 1950 |
| 2,611,010 | Sass et al. | Sept. 16, 1952 |
| 2,668,933 | Shapiro | Feb. 9, 1954 |
| 2,692,961 | Fondiller | Oct. 26, 1954 |